United States Patent [19]

Crawford et al.

[11] 4,002,272
[45] Jan. 11, 1977

[54] MATERIAL UNLOADING IMPLEMENTS

[75] Inventors: Alexander Crawford, Guy's Cliff; Alfred J. Bailey, Coventry, both of England

[73] Assignee: Massey-Ferguson Services N.V., Curacao, Netherlands Antilles

[22] Filed: May 8, 1975

[21] Appl. No.: 575,896

[30] Foreign Application Priority Data

May 10, 1974 United Kingdom ............ 20667/74

[52] U.S. Cl. .............................. 222/392; 214/82; 222/262; 239/672; 239/677
[51] Int. Cl.² ............... B67D 5/08; A01C 19/00
[58] Field of Search ... 222/389, 392, 178, 256–262; 214/2.5, 75 T, 82; 239/672, 677

[56] References Cited

UNITED STATES PATENTS

| 2,478,228 | 8/1949 | Benson | 222/392 X |
| 2,480,527 | 8/1949 | Wachter | 214/82 |
| 2,701,654 | 2/1955 | Williamsen | 214/75 T |
| 3,021,968 | 2/1962 | Myers | 214/82 |
| 3,280,920 | 10/1966 | Scott | 214/2.5 X |
| 3,371,805 | 3/1968 | Himes | 214/75 T |

FOREIGN PATENTS OR APPLICATIONS 1,205,135  9/1970  United Kingdom ............ 239/672

Primary Examiner—Stanley H. Tollberg
Assistant Examiner—Hadd Lane
Attorney, Agent, or Firm—Robert L. Farris

[57] ABSTRACT

Spreader for farmyard manure has a moving wall to push manure to a discharge rotor. The wall is moved by a hydraulic ram located at the side of the spreader. The ram is coupled to the wall by chains trained round pocket wheels or sprockets.

8 Claims, 14 Drawing Figures

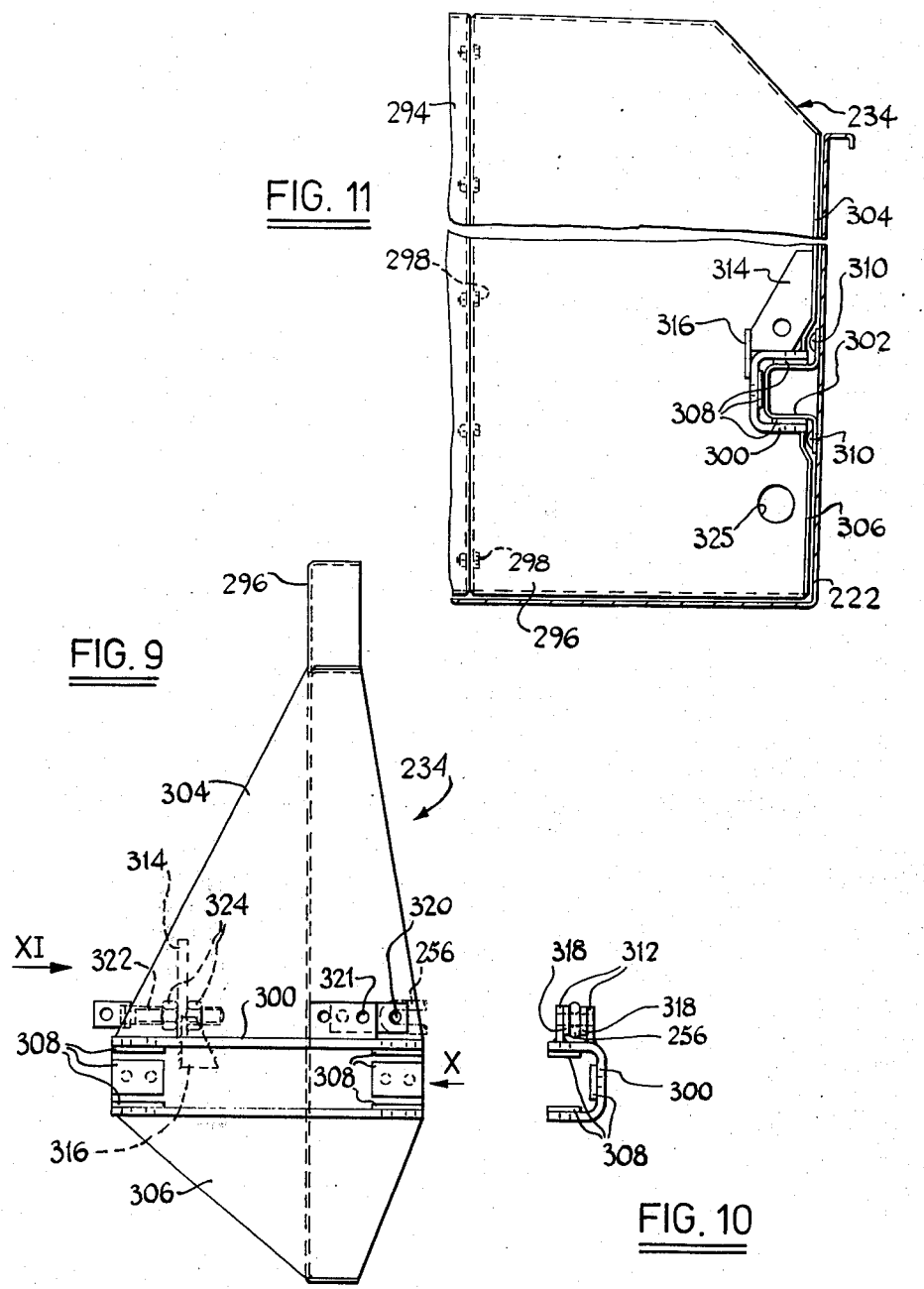

MATERIAL UNLOADING IMPLEMENTS

This invention relates to material unloading implements, and in particular, though not exclusively, to such implements in the form of farmyard manure spreaders.

Changes in animal husbandry techniques resulting in a large increase in the number of cattle and pigs which are raised in buildings as opposed to open fields have produced a large demand for manure spreaders.

To meet this demand, two kinds of manure spreader are marketed. Each of these is however subject to at least one disadvantage. Firstly, there is the widely used so-called flat bed spreader, which employs a chain and slat conveyor to move manure within a container to a spreading device. This implement is more or less satisfactory for dealing with solid manure but it cannot deal effectively with liquid or semi-liquid manure. Secondly, there is the spreader shown in U.S. Pat. No. 2,886,332. This implement is simple and robust and is able to handle both liquid or semi-liquid manure and solid manure. However, it requires an undesirably high torque to start up its discharge rotor when spreading is commenced.

Proposals for further kinds of manure spreaders have also been made but, up to now, these proposals have involved structures which are too complex or too susceptible to damage or are otherwise unsatisfactory for use under agricultural conditions.

An object of the present invention is to provide a manure spreader offering a better compromise between its advantages and disadvantages.

According to the invention there is provided a material unloading implement comprising:
a material container, the material container having a material unloading station; a material pushing member which can be mounted on the material container for movement towards the material unloading station to move material within the container towards the unloading station; a thrust device actuable by fluid pressure; and thrust transmission means to transmit thrust from the thrust device to the material pushing member to move the material pushing member towards the material unloading station; wherein the thrust transmission means comprises a flexible tension member, there being also provided a training member around which the flexible tension member can be trained, whereby in use the flexible tension member draws the material pushing member towards the training member.

The provision of a flexible tension member and a training member around which the flexible tension member can be trained allows the material pushing member to be coupled to the thrust device in a simple manner whereby a given amount of movement of the thrust device produces more than said given amount of movement of the material pushing member, whereby the stroke of the thrust device, for example a ram, is less than would otherwise be required.

Preferably a further training member is provided, the training member being mounted at spaced apart positions on the implement and the flexible tension member being trained round both of the training members and being connected to the material pushing member between the training members.

Embodiments of the invention will now be described by way of example with reference to the accompanying drawings, in which:

FIG. 9 shows, on a larger scale, a material pushing member seen in FIG. 6;

FIG. 10 shows a portion of the material pushing member of FIG. 9 as viewed in the direction indicated by arrow X therein;

FIG. 11 shows a portion of the material pushing member of FIG. 9 as viewed in the direction indicated by arrow XI therein and partly cut away, together with a portion of a side wall of the manure spreader on which it slides, which is shown in section and partly cut away;

Figure 1:
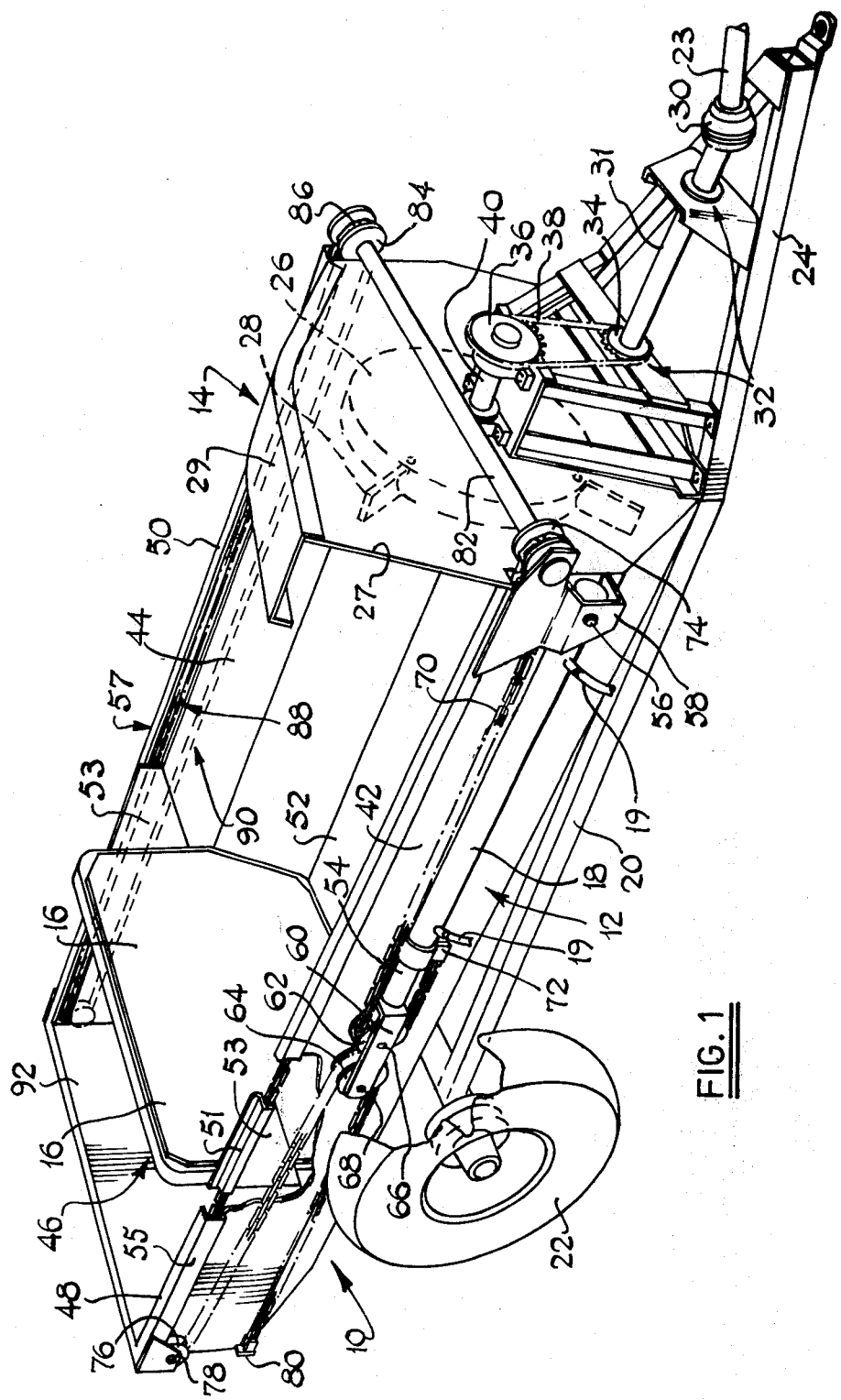
FIG. 1 shows a perspective view of a manure spreader, with certain parts cut away, constituting a first embodiment of the invention.

As shown in FIG. 1, a material unloading implement in the form of a farmyard manure spreader 10 comprises a material container 12 having a material unloading station 14, a material pushing member or wall 16, and an operating mechanism for member 16 comprising a thrust device in the form of a double-acting hydraulic ram 18 adapted to be connected by conduits 19 to a source of hydraulic pressure and mounted outside the container 12.

Material container 12 is mounted on a chassis 20 supported by ground wheels 22 and having a drawbar 24 at its forward end for connection to a tractor (not shown).

Material unloading station 14 is at the forward end of container 12 with respect to the direction of usual forward motion of the spreader 10 and is provided with a rotatable impeller 26 carrying pivoted flails 28 at its periphery. The forward end wall 27 of container 12 together with a channel-section guide 29 serve to guide manure discharged by the impeller.

Drive means for impeller 26 whereby it is driven by the power take-off shaft (not shown) of the tractor comprises a primary shaft 23 connected to a secondary shaft 31 by a universal joint 30. Secondary shaft 31 is supported by bearings 32 at each end and is drivably coupled to impeller 26 by sprockets 34, 36 and a roller chain 38, and by a stub shaft 40 lying on the axis of rotation of the impeller.

Material pushing member 16 is in the form of a rigid wall proportioned to fit between the side walls 42, 44 of container 12. The wall 16 projects upwards so that its upper edge 46 lies above the upper edges 48, 50 of the side walls of the container. The shape of the wall is such that it conforms closely to the shape defined by side walls 42, 44 and base wall 52 of the container. The wall 16 is held against changes in attitude relative to the material container 12 during use by co-operating guide elements 51 and 55, 57 at each end of the wall. Each guide element 55, 57 is in the form of a channel section member defining a groove and is mounted at the upper edge of its respective side wall 42, 44 of container 12. A flanged box-section member (constituting guide element 51) is freely slidable in each groove. Guide elements 51 (of which only one can be seen in FIG. 1) are rigidly secured to wall 16 through reinforcing plates 53.

Hydraulic ram 18 is mounted adjacent side wall 42 of container 12 and has a rearwardly projecting piston rod 54. The forward end of the ram is mounted by means of a pivot pin 56 on a bracket 58 at the front of container 12. The rear end of the ram is supported by piston rod 54. The rear end of the piston rod has rigidly fixed thereto a U-shaped bracket 60 in which a pair of wheel or pulley members in the form of pocket wheels 62, 64 are freely rotatable on respective spindles 66, 68. Pocket wheels 62, 64 are thus displaceable by the ram.

Thrust transmission means comprising a flexible tension member 70 in the form of a link or anchor chain extends round pocket wheels 62, 64 to transmit thrust from ram 18 to wall 16. One end of chain 70 is anchored by a lug 72 fixed to the rear end of the cylinder portion of ram 18. The chain extends rearwards from lug 72, round pocket wheel 62, and forwards to another pocket wheel 74 which is freely rotatably mounted on bracket 58. From pocket wheel 74 the chain extends rearwards in a single run along the full length of container 12 and through channel section member 55 and its associated sliding guide element 51 to a pocket wheel 76 which is freely rotatably mounted on a bracket 78 at the rear end of the container. From pocket wheel 76, chain 70 extends forwards to pocket wheel 64 and finally rearwards to a bracket 80 fixed to the rear end of container 12, and is anchored thereto.

Pocket wheels 74 and 76 constitute training members for the flexible tension member or chain 70.

Chain 70 is secured to guide elements 51 to transmit thrust to the wall 16.

In order that thrust is transmitted to wall 16 equally at two spaced positions thereon, thrust transmission means is provided to connect piston 54 of ram 18 to the other guide element 51 (not seen in FIG. 1) which is slidable in channel section member 57. The said thrust transmission means comprises a transverse shaft 82 drivably coupling pocket wheel 74 with a further pocket wheel 84 which is supported for rotation on a bracket (not seen in FIG. 1) in a manner similar to pocket wheel 74. The thrust transmission means further comprises a further flexible tension member in the form of an anchor-type chain 86 arranged in a closed loop comprising an upper run 88 and a lower run 90. Chain 86 drivingly engages pocket wheel 84 and extends in its upper run 88 through and along the length of the groove defined by channel section member 57. The chain 86 extends through and is fastened to its respective wall support member 51 (not seen in FIG. 1) in the same way as chain 70. At the other end of its upper run, chain 86 passes round a freely rotatable pocket wheel (not shown) similar to pocket wheel 76.

Pocket wheel 84 and the other pocket wheel (not shown) around which chain 86 is trained, constitute training members for chain 86.

In use, drawbar 24 is coupled to a tractor in the usual manner and ram 18 is connected by the two flexible conduits 19 to a spool valve controlling the supply of hydraulic fluid from the tractor (not shown). Shaft 23 is coupled to the power take-off shaft of the tractor.

From the position shown in FIG. 1, ram 18 is first fully contracted to move wall 16 to a position adjacent end wall 92 of the container 12. The container is then filled with farmyard manure by means, for example, of a tractor having a front end loader. The spreader is then towed to the field where the manure is to be spread.

To commence spreading, power is first transmitted to rotor 26 by letting-in the p.t.o. clutch on the tractor. Then ram 18 is energised by means of the spool valve to commence extension of the ram. The ram thrust is transmitted through chain 70, training member 74, shaft 82, training member 84, and chain 86 to the wall 16. The thrust is applied substantially equally to the opposite ends of the wall. The wall feeds the manure to rotor 26 which steadily discharges it during progress of the spreader along the area to be spread.

The wall 16 stops just short of rotor 26 when ram 18 is fully extended. The spool valve is then operated to retract the ram so as to move wall 16 back to the rear end of the container 12 whereupon the container can be refilled with manure and spreading continued.

Among the advantages provided by the above-described embodiment of the invention are:
1. container 12 can easily be made liquid-tight whereby the spreader can be used for discharging liquid and semi-liquid manure;
2. the starting-up torque for rotor 26 is not unduly high because:
    a. the structure and arrangement of the rotor permits it to free itself easily after container 12 has been filled; and
    b. the rotor can be started up before drive to wall 16 is commenced, or wall 16 could even be moved rearwards a little before or during start-up;
3. during use, the power required from the tractor's p.t.o. is relatively low because the p.t.o. is only required to drive rotor 23;
4. the rate of discharge is positively controlled by the rate of extension of ram 18 and is infinitely variable up to a chosen maximum rate;
5. the mechanism for moving wall 16 can be provided with protection against overloads by merely incorporating a pressure relief valve in the hydraulic system which operates ram 18.

Figure 2:
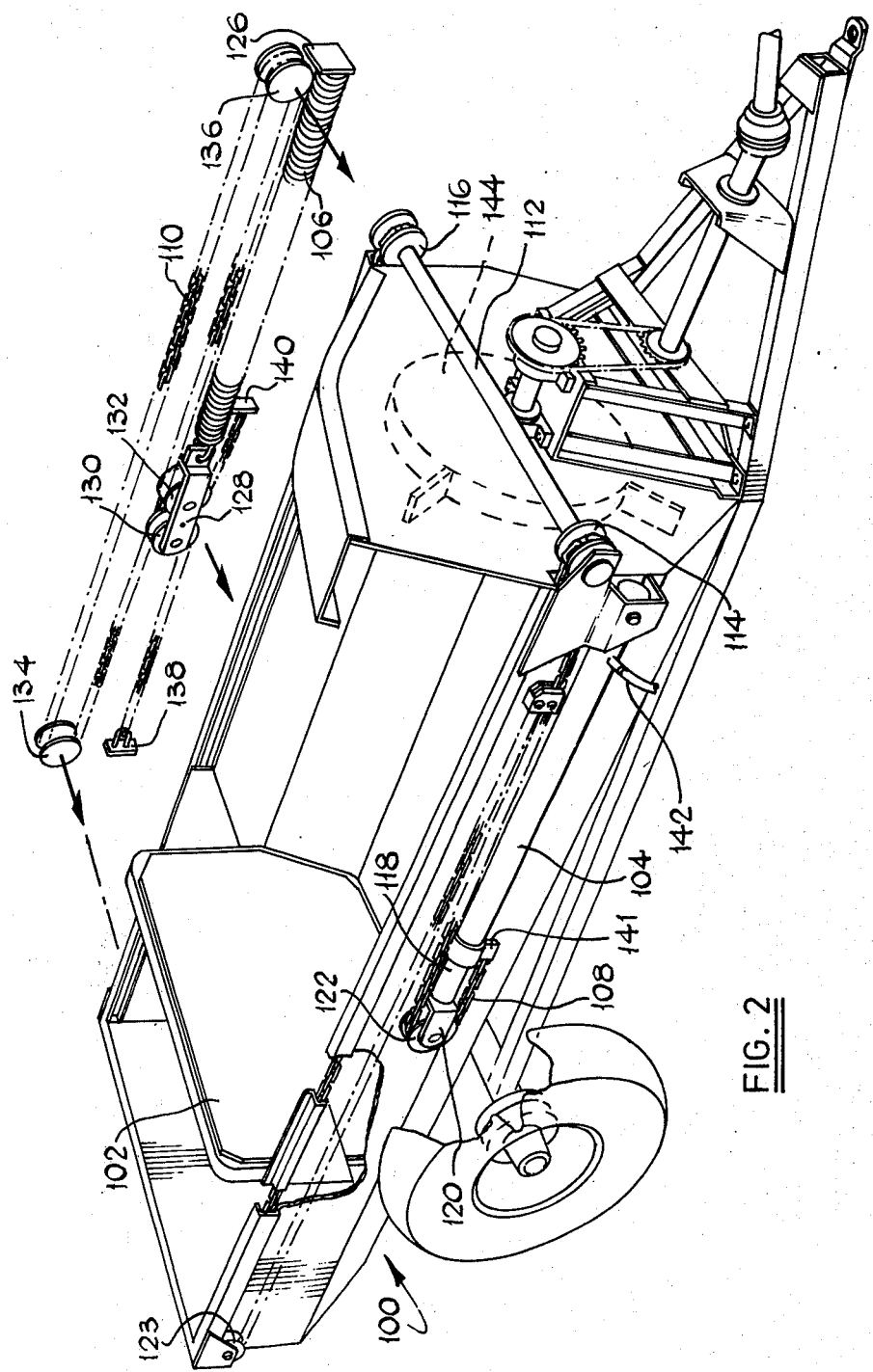
FIG. 2 shows a perspective view, partly exploded, and similar to that of FIG. 1, of a manure spreader constituting a second embodiment of the invention.

In the embodiment illustrated in FIG. 2, a manure spreader 100 is constructed and arranged substantially as in the embodiment of FIG. 1 except that a modified operating mechanism is provided for a wall 102 corresponding to wall 16.

In place of the double acting ram 18 there is provided a single acting ram 104 together with resilient return means in the form of a coiled tension spring 106. Thrust is transmitted to opposite ends of wall 102 from ram 104 by chains 108, 110 on opposite sides of the spreader drivably connected by a transverse shaft 112 carrying pocket wheels 114, 116 — in a manner similar to that of the embodiment of FIG. 1. However, in order to accommodate return spring 106, the arrangement of the chains differs somewhat from that of the previous embodiment.

The piston rod 118 of ram 104 has fixed thereto a U-shaped bracket 120 in which a single pocket wheel 112 is freely journalled so as to be displaceable by the ram. The arrangement of chain 108 is the same as that of chain 70 in the previous embodiment except that, after passing round a pocket wheel 123 (corresponding to pocket wheel 76), instead of passing round a second pocket wheel carried by the piston rod of the ram (corresponding to wheel 64), the chain extends forwards to a position (as shown in FIG. 2) close to pocket wheel 114 and its end is there fastened to one of its own links by means of a fastener 124.

Tension spring 106 is fastened at one end to a plate 126 fixed to the body of the manure spreader. At its other end the spring is linked to a U-shaped bracket 128 in which a pair of pocket wheels 130, 132 are freely journalled. Chain 110 extends around end pocket wheels 134, 136 as chain 86 does in the previous embodiment, and its upper run is fastened to wall 102. However, instead of having its ends joined, as in the previous embodiment, chain 110 extends around pocket wheels 130, 132 and its ends are fastened to respective brackets 138, 140 fixed to the body of the manure spreader.

Pocket wheels 114, 123 and 116, 134 constitute training members for the chains 108 and 110. It is to be noted also that chain 108 in effect comprises a closed loop, which includes fastener 124 and is arranged in two runs, together with a relatively short branch portion extending from fastener 124 to a lug 141 (corresponding to lug 72). The said branch portion can be considered as a further flexible tension member joined to the closed loop.

Ram 104 is connected by a single pressure hose 142 to a source of hydraulic fluid under pressure on a tractor (not shown).

In use, when hydraulic fluid under pressure is supplied to ram 104 through hose 142, the ram extends and moves wall 102 and the manure towards the rotor 144 as in the previous embodiment, but in this case such movement causes extension of return spring 106. When all the manure has been spread, the hydraulic control system on the tractor is operated to connect hose 142 to a reservoir in the hydraulic control system and spring 106 then moves wall 102 back to the rear of the manure container and retracts ram 104 so that the hydraulic fluid therein is returned to the reservoir.

The embodiment of FIG. 2 has all the advantages mentioned above in connection with FIG. 1 and in addition is cheaper and simpler, in that only a single-acting ram is required and no spool valve, nor is a second pressure hose needed for connection to the ram.

Figure 3:
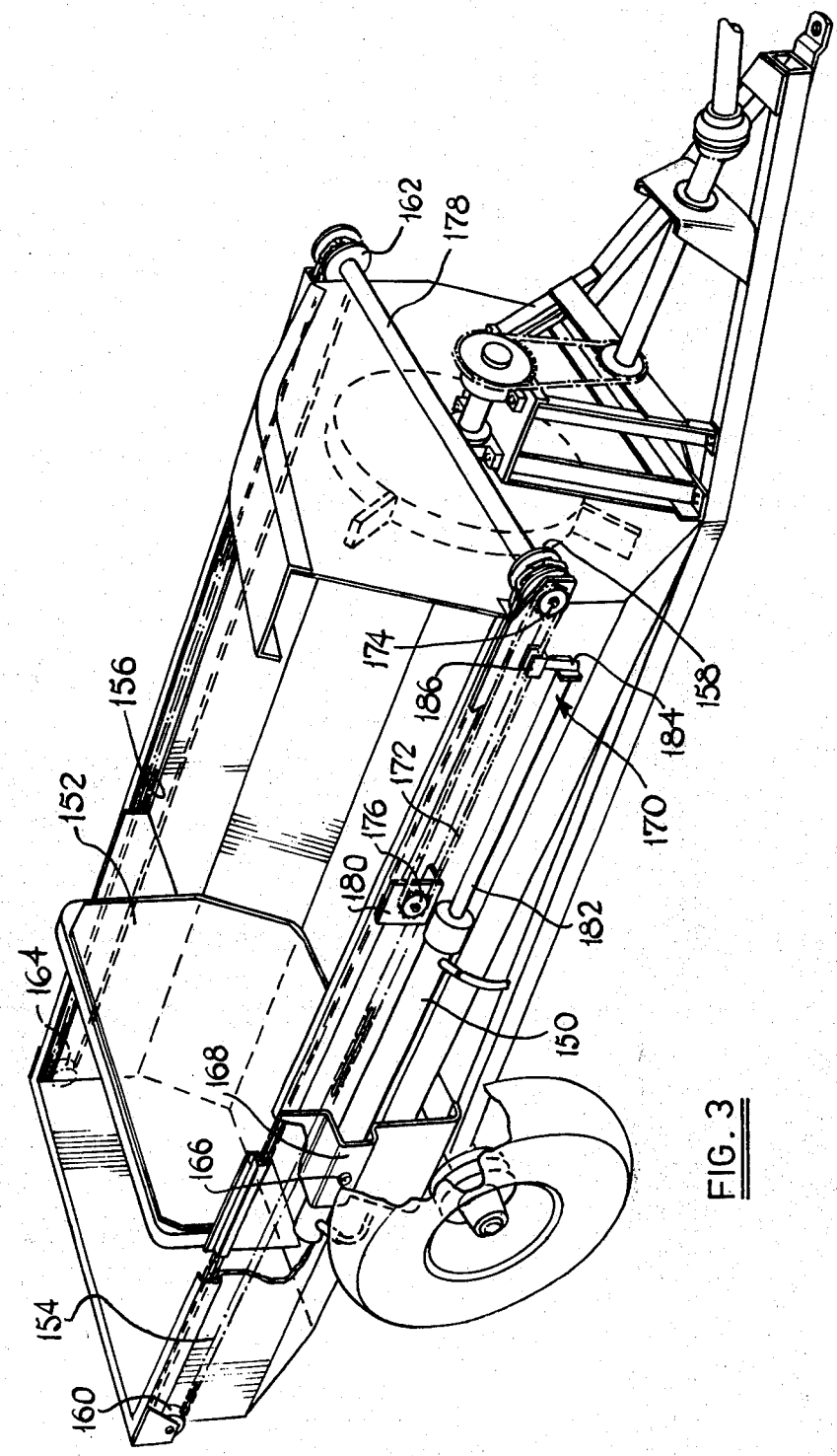
FIGS. 3 and 4 show perspective views, similar to those of FIGS. 1 and 2, of the third and fourth embodiments, respectively, of the invention.

The embodiment of FIG. 3 otherwise has substantially the same structure as the embodiment of FIG. 1, but has a different thrust transmission means to transmit thrust from a double-acting hydraulic ram 150 to movable wall 152.

Wall 152 is connected at each end to the upper run of two endless chains 154, 156 in the same manner as wall 16 is connected to chain 86. The chains 154, 156 are trained round respective training members in the form of pocket wheels 158, 160 and 162, 164 in exactly the same manner as the chain 86 in the FIG. 1 embodiment.

Ram 150 is mounted by means of a pivot pin 166 on a bracket 168 fixed to the body of the manure spreader. The ram is drivably connected to pocket wheel 158 by a device which changes linear motion into rotary motion whereby the linear thrust of the ram, which produces linear motion, is changed into rotary motion.

The device 170 comprises a flexible drive transmission member in the form of a roller chain 172 trained round a pair of rotary elements in the form of sprockets 174, 176. Sprocket 174 is drivably fixed to the transverse shaft 178 which interconnects pocket wheels 158 and 162, alongside pocket wheel 158. Sprocket 176 is freely journalled on a bracket 180 fixed to the body of the manure spreader.

The piston rod 182 of ram 150 has fixed thereto an upstanding spigot 184 carrying a channel section member 186 through which the lower run of chain 172 passes and to which the chain is fixed.

In use, extension and retraction of ram 150 causes rotation of sprocket 174 whereby pocket wheels 158 and 162 are also rotated and wall 152 moved along the manure container as desired.

It will be noted that the effective diameter of sprocket 174 is smaller than that of pocket wheel 158 whereby these members constitute a velocity change device so that a given degree of movement of piston rod 182 causes more than said given degree of movement of wall 152. This provides a convenient means of matching the stroke of the ram to the desired travel of wall 152.

Figure 4:
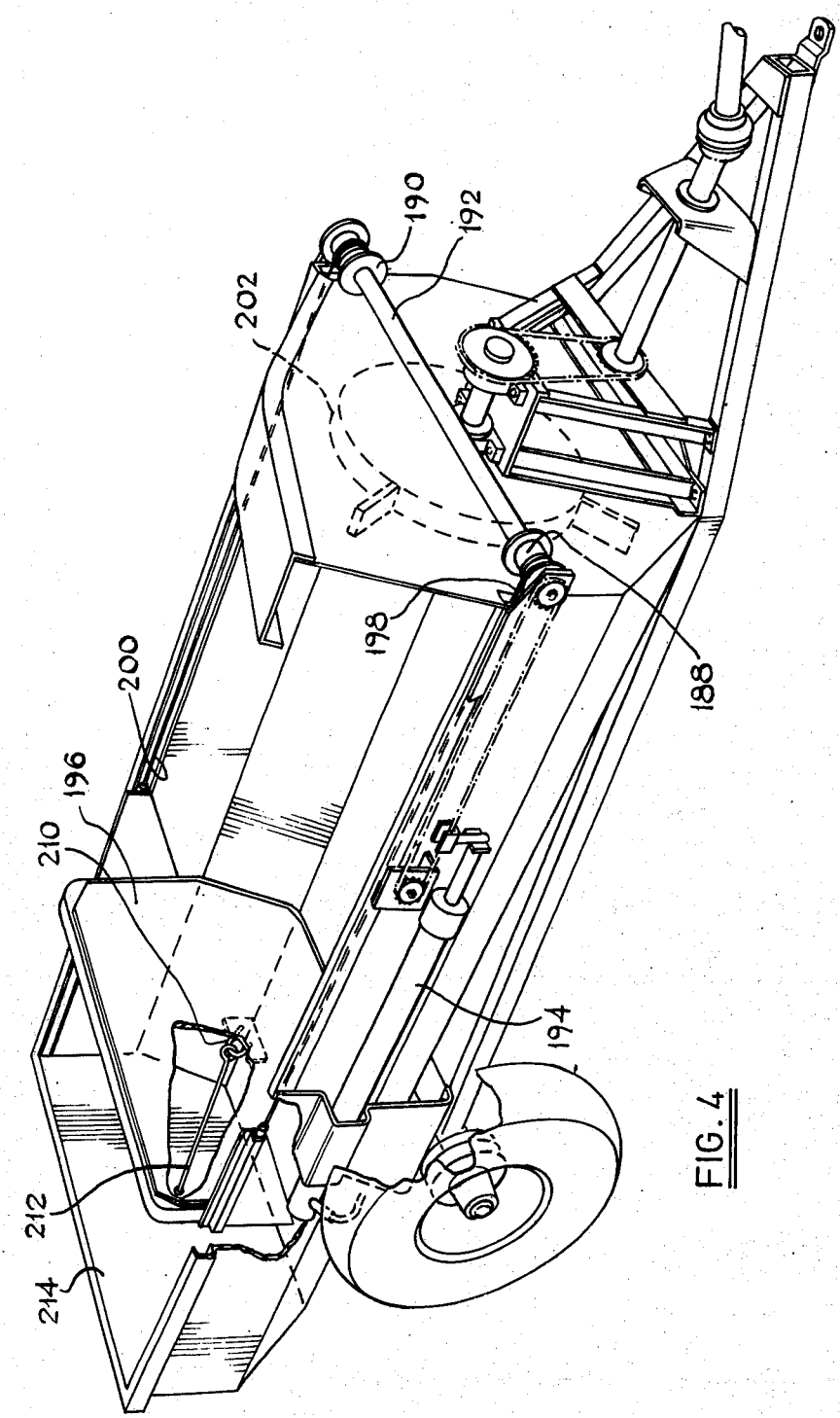
Figure 8:
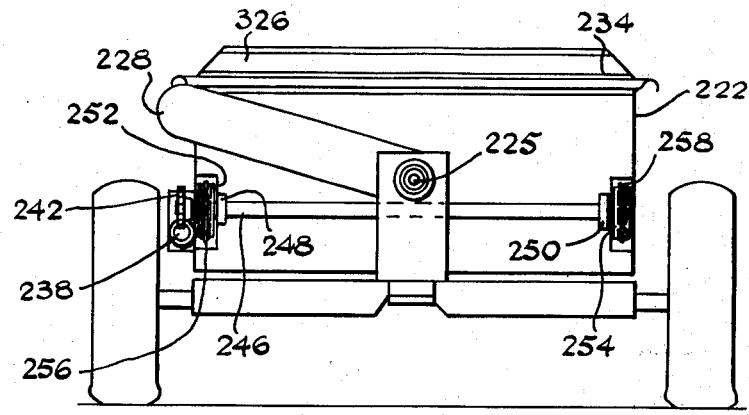
FIG. 8 shows, in end elevation, the manure spreader of FIG. 6, as indicated by arrow VIII therein.
Figure 5:
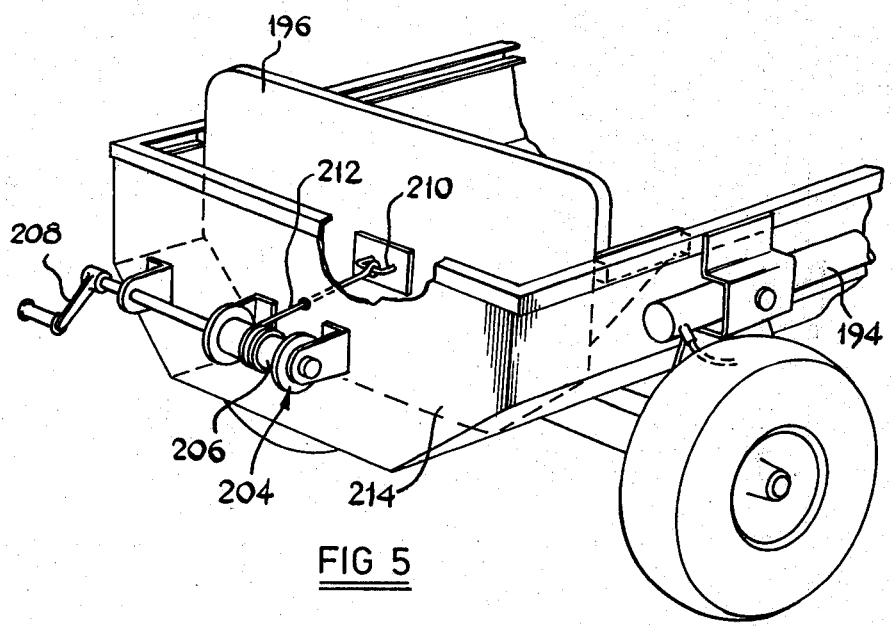
FIG. 5 shows a perspective view of the rear part of the spreader of FIG. 4.
Figure 6:
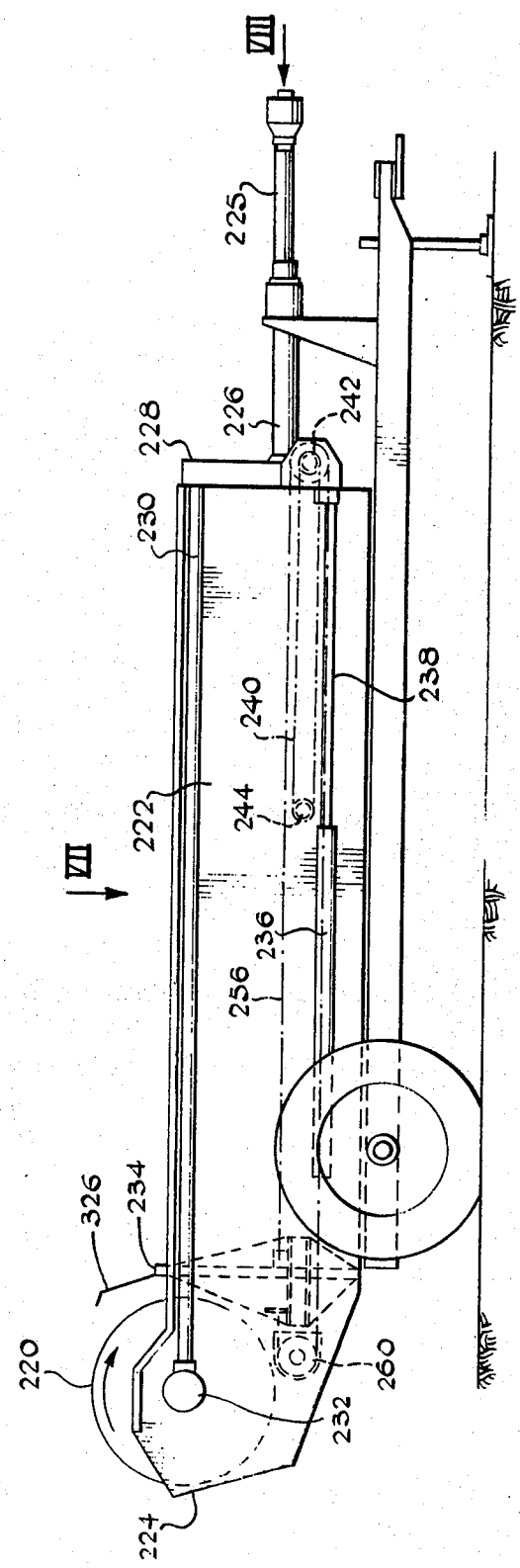
FIG. 6 shows, in side elevation, a manure spreader constituting a fifth embodiment of the invention.
Figure 7:
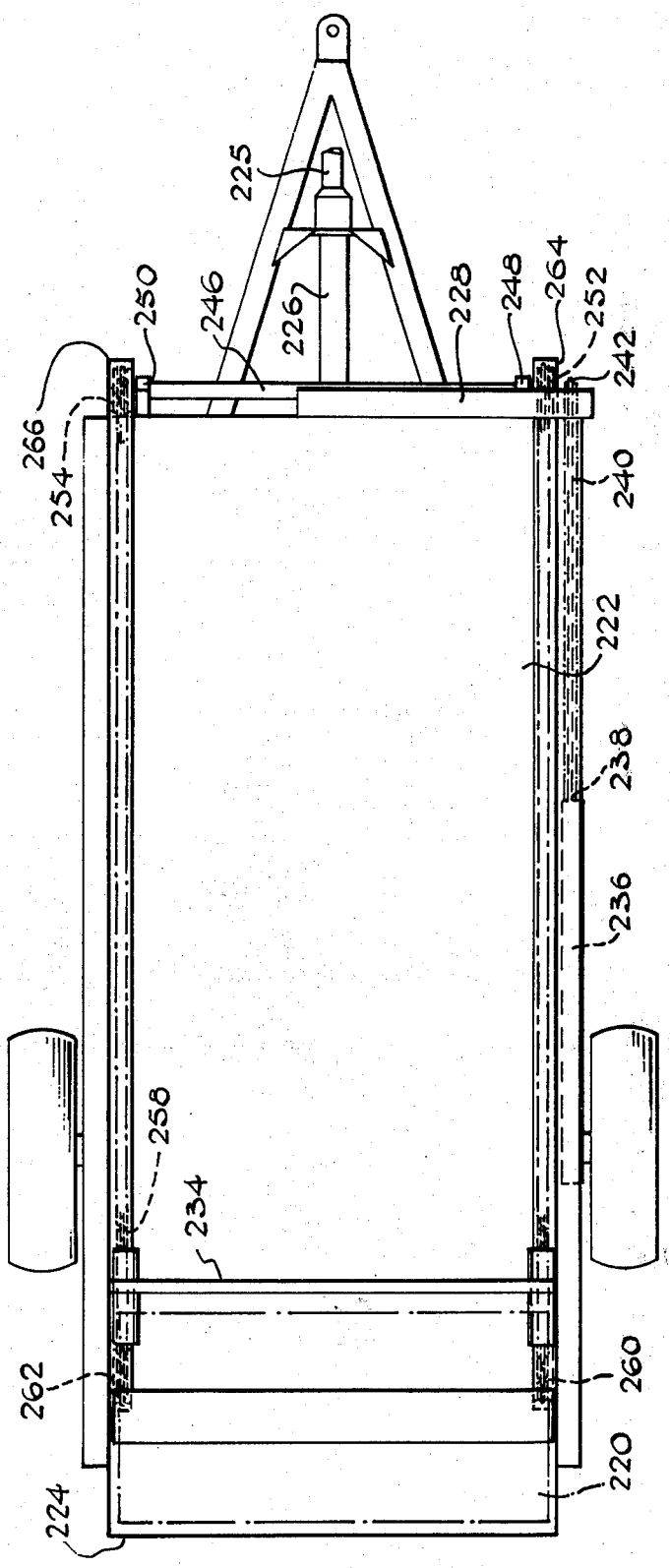
FIG. 7 shows a plan view of the manure spreader of FIG. 6, as indicated by arrow VII therein.
Figure 12:
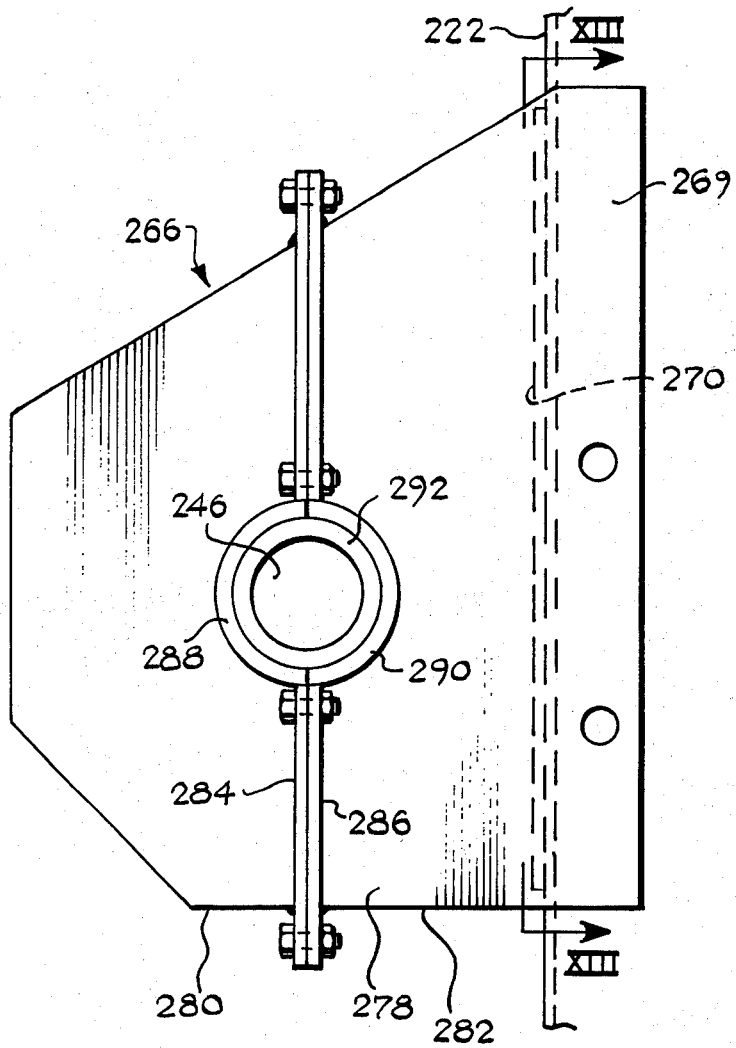
FIG. 12 shows in side elevation a housing for a pocket wheel also seen in FIG. 7 as viewed from the left hand side of the spreader.

The embodiment of FIGS. 4 and 5 has substantially the same structure as the embodiment of FIG. 3 except that a single-acting ram is employed, together with different tension members and training members transmitting thrust from the ram to the movable wall.

In place of pocket wheels 158 and 162 of FIG. 3, there is provided a pair of flanged drums 188, 190 mounted on a shaft 192. Shaft 192 is arranged to be driven by the single-acting ram 194 in the same manner as the shaft 178 of FIG. 3. Drums 188, 190 are connected to the movable wall 196 by wire cables 198, 200 and the drums thereby act in the manner of a winch or capstan to haul the wall towards the discharge rotor 202.

To return wall 196 to the rear end of the manure spreader there is provided at the rear of the spreader a manually operable winch 204 (FIG. 5) comprising a flanged drum 206 arranged to be rotated by a handle 208. Drum 206 is connected to a U-bolt 210 at the rear of wall 196 by a wire cable 212 which passes through an aperture in the rear wall 214 of the manure container.

In use, extension of ram 194 rotates the winches 188, 190 which haul wall 196 towards discharge rotor 202. The wall is returned to its rearmost position by manually rotating winch 204 — which is also effective to retract ram 194.

This embodiment has the advantage over the embodiment of FIG. 3, that it is somewhat simpler, and is cheaper to manufacture.

The embodiment of FIGS. 6–12 has a discharge rotor 220 (shown diagrammatically) at the rear of a manure container 222. The rotor is of any suitable construction for flinging manure over the rear wall 224 of container 222. For example the rotor may comprise a series of flails pivotally mounted on a common transverse shaft and arranged helically around the shaft and provided with teeth at their outer ends, as shown in our co-pending U.S. Pat. No. 3,964,714.

Rotor 220 is driven in the direction indicated, by a tractor power take-off shaft via shafts 225, 226, an enclosed chain drive 228, a shaft 230 extending lengthwise of container 222, and a bevel gearbox 232. The rotor may be rotated in the opposite direction if desired, to modify the spread pattern.

A movable wall 234 is provided to move manure to rotor 220 and is actuated by a double-acting hydraulic ram 236 in a manner similar to that employed in the embodiment of FIG. 3. For this purpose, piston rod 238 of ram 236 is coupled to a roller chain 240 trained round sprockets 242, 244. Sprocket 242 is mounted on and drives a transverse shaft 246 which is positioned at a level in the region of the bottom of the manure container 222 and is journalled on bearings 248, 250 carried by the container.

A pair of pocket wheels 252, 254 are mounted on at each end of shaft 246 to drive respective anchor-type chains 256, 258 extending in upper and lower runs through container 222 and passing round respective freely rotatable idler pocket wheels 260, 262 at the rear end of the container. The ends of chains 256, 258 are secured to wall 234 in a manner to be described.

Figure 13:
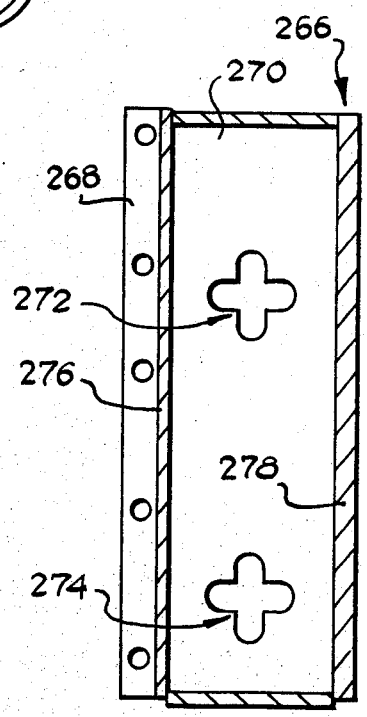
FIG. 13 shows a sectional view on the line XIII—XIII in FIG. 12.

The pocket wheels 252 and 254 are mounted inside housings 264, 266 respectively, one for each wheel. Each of the housings is bolted by means of apertured flanges 268, 269 (FIGS. 12 and 13) to the front wall and a side wall respectively of manure container 222. A flat end wall 270 of the housing is held against the front wall of container 222 and is formed with upper and lower openings 272, 274, each in the shape of a cross to allow the chains 256 and 258 to enter and leave the housing. The openings are proportioned so that the edges thereof fit closely around the chains, thereby preventing the entry of hard objects such as stones and also string and the like into the housing. Corresponding openings are formed in the front wall of container 222.

The housings 264 and 266 constitute substantially liquid-tight extensions of the manure container 222.

The housings 264, 266 each comprise two separable portions 280, 282 for assembly purposes. These portions are bolted together by means of apertured mating flanges 284, 286. Walls 276, 278 are each formed with complementary semi-cylindrical supports 288, 290 for an annular shaft seal 292.

Details of the structure of movable wall 234 are shown in FIGS. 9, 10 and 11. The wall comprises a central wall portion 294 and two side wall portions 296. The wall portions are of flat steel sheet formed with peripheral flanges and secured together by bolts 298.

Wall 234 is supported on and guided by the side wlls of container 222 by means of co-operating U-section guide elements 300, 302. Guide element 300 is welded along its length to upper and lower tapering flanges 304, 306 respectively which are integral with their respective outer wall portion 296. Two sets of three low friction bearing pads 308 are fixed inside guide element 300, one set at each end thereof. Guide element 302 extends along the length of container 222 and is fastened to the inside wall thereof by rivets 310.

The chains 256, 258 are fastened to wall 234, at one side by means of a pair of spaced upstanding apertured ears 312 welded to guide element 300, and at the other side by means of an upstanding bracket 314 welded to flange 304 and to guide element 300 and to a reinforcement member 316. A pair of flat extension links 318 formed with apertures, and a pair of bolts 320, 321 which pass through ears 312 provide a degree of length adjustment in the attachment of one end of each chain 256, 258 to wall 234. At the other end of the chains, a threaded bolt 322 fastened to the chain passes through bracket 314, and associated nuts 324 provide adjustment of chain tension. A clearance opening 324 is formed in the wall for the return run of the chain.

Wall 234 has an upstanding rearwardly inclined shield plate 326 (shown in FIG. 6 only) at its upper edge and extending across the full width of manure container 222. Plate 326 serves to minimize the amount of manure flung by rotor 220 back into container 222 on the forward side of wall 234.

In use, ram 236 moves wall 234 and the manure towards rotor 220. The rotor shreds and flings the manure over rear wall 224 onto the ground. After the container is emptied, the ram is retracted so as to move the wall to the front end of the container and the container is refilled with manure.

The principal advantages of this embodiment over the previously described embodiments arise from the arrangement of the discharge impeller in relation to the manure container whereby the impeller is only partly immersed in the manure but is maintained at the correct degree of immersion by means of wall 234. The space between the bottom of the locus of the rotor and the bottom of the manure container lies within the range of one half to one and a half times the radius of the rotor. The upwardly ramped rear end of the manure container ensures that solid manure slides upwards to the rotor during use.

A further advantage arises from the manner of moving and guiding wall 234. Chains 256 and 258 pull the wall at a comparatively low position thereon. Consequently there is a reduced tendency for the wall to twist and it therefore slides more freely on its guides. Also, the guides are low down inside container 222 and are therefore protected from accidental damage by, for example, a front end loader mounted on a tractor and used for filling container 222 with manure.

Figure 14:
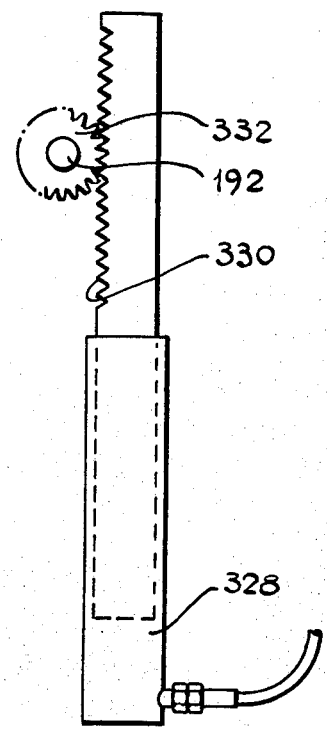
FIG. 14 illustrates a modification, applicable to all of the preceding embodiments, in which thrust from a hydraulic ram is transmitted to a movable material pushing member through a rack and pinion device.

FIG. 14 illustrates an alternative manner of actuating the movable wall in the above-described embodiments. In place of the hydraulic rams at the side of the manure containers which, by various means are coupled to the transverse shafts 82, 112, 178, 192 and 246 to effect rotation thereof, there is provided a ram 328 which is directly coupled to such a shaft, e.g. 192, by means of a rack 330 formed on the piston rod of the ram and held in driving engagement with a pinion 332 secured to the shaft.

Among modifications which can be made in the above-described embodiments without departing from the scope of the invention are:

1. the provision of a movable or removable wall portion in the manure container so as to allow the moving wall simply to push material such as cattle feed through the opening so produced. For example end wall 92 could be made removable. In such a case it would be desirable to provide sealing means around the periphery of the movable wall portion to minimize the escape of liquid when the implement is carrying liquid manure;
2. where a movable wall portion as mentioned in 1. above is provided, the discharge rotor may be eliminated. In such a case the movable wall portion constitutes the material unloading station;

3. where a discharge rotor is provided it may be located at either end of the manure container;

4. considerable variation in design of the discharge rotor itself is possible. Flails are desirable at the periphery of the rotor to further reduce the start-up torque. However where the implement is to be used for manure spreading, cutting and flinging members are preferably provided on the face of the rotor which engages the manure. The implement could however be used with a discharge rotor designed to fling particulate cattle feed into a feed bunk for example, in which case cutting members would probably not be needed. The rotor may operate in an overshot manner or in an undershot manner i.e. it may rotate in either direction;

5. the use of gas under pressure instead of hydraulic fluid, to actuate the thrust device which moves the material pushing member;

6. the use of a hydraulic pump mounted on the spreader and driven by the tractor's p.t.o. shaft, to supply hydraulic fluid to the rams which move the material pushing member;

7. the use of flexible tension members connected to the base of the movable wall or material pushing member. In this case, the flexible tension members could be provided with transverse slats or scraper bars in the manner of a chain and slat conveyor as used in the so-called flat bed type manure spreaders. Some modification of the training members would probably be needed to accommodate the slats;

8. the use of alternative flexible tension members such as cables, wires, ropes, chains and belts of any suitable kind;

9. the use of alternative training members. As described above, in some embodiments of the invention, the training member operates as a winch or capstan and can be constructed in any suitable form for that purpose such as a drum or reel. In other embodiments, the training member serves to transmit drive between a flexible tension member and a shaft and for this purpose may be in the form of a pocket wheel or other chain wheel, a sprocket, a pulley (toothed for example). In further embodiments, the training members serve simply to guide the flexible tension member and for this purpose may be simply in the form of a pulley or other wheel or even a fixed low friction drum or other guide.

It will be appreciated that in order to provide a constant rate of movement of the moving wall in the container during use, there should be provided a supply of hydraulic fluid to the ram at a constant rate independent of pressure (subject of course to pressure limitation by a relief valve, if provided). Such a supply of fluid can be obtained from the hydraulic system of a tractor having a positive displacement hydraulic pump controlled by a spool valve on the suction side of the pump. Where the spool valve has metering ports, these allow for selective variation of the rate of movement of the wall while retaining constant wall speed at any given setting. This facility is available from the hydraulic systems of certain tractors when set for "draught control" — the trailed manure spreaders described above providing no input signal to the tractor's draught sensing system.

I claim:

1. A material unloading implement comprising: a material container, the material container having a material unloading station; a material pushing member which can be mounted on the material container for movement towards the material unloading station to move material within the container towards the unloading station; a thrust device actuable by fluid pressure; and thrust transmission means to transmit thrust from the thrust device to the material pushing member to move the material pushing member towards the material unloading station, wherein the thrust transmission means comprises a flexible tension member, there being also provided a training member around which the flexible tension member can be trained, whereby in use the flexible tension member draws the material pushing member towards the training member, a further training member on the implement at a position spaced from said training member and the flexible tension member trained round said training member and said farther training member with at least one end of the tension member fastened to another portion of the tension member to form a closed loop having two runs extending between the training members, the tension member being coupled to the material pushing member in one of the runs and being coupled to the thrust device in the other run through a velocity change device whereby a given degree of movement of the thrust device causes more than said given degree of movement of the tension member, said velocity change device including a further flexible tension member which passes round at least one wheel mounted so as to be displaceable under the action of the thrust device, the further flexible tension member having one end connected to said other run of the tension member and its other end anchored, and wherein at least one of the training members drivably engages the tension member.

2. A material unloading implement comprising: a material container, the material container having a material unloading station; a material pushing member which can be mounted on the material container for movement towards the material unloading station to move material within the container towards the unloading station; a thrust device actuable by fluid pressure; and thrust transmission means to transmit thrust from the thrust device to the material pushing member to move the material pushing member towards the material unloading station, wherein the thrust transmission means comprises a flexible tension member, there being also provided a training member around which the flexible tension member can be trained, whereby in use the flexible tension member draws the material pushing member towards the training member, a further training member mounted on the implement at a position spaced from said training member with the flexible tension member trained round said training member and said further training member connected to the material pushing member between the training members, and wherein at least one end of the tension member is fastened to another portion of the tension member to form a closed loop trained around the training members, at least one of which drivably engages the tension member and wherein the thrust device is drivably coupled to the tension member through one of the training members and wherein the thrust device is constructed so as to produce a linear thrust and is drivably coupled to one of the training members through a device which changes linear motion into rotary motion.

3. An implement according to claim 2 characterized in that the device which changes linear motion into rotary motion comprises a rack and pinion, the rack being operable by the thrust device and the pinion being drivably connected to one of the training members.

4. An implement according to claim 2 characterized in that the device which changes linear motion into rotary motion comprises a flexible drive transmission member and two or more rotary elements, the drive transmission member being trained around and being drivably coupled to at least one of the rotary elements, the thrust device being coupled to the flexible drive transmission member between the rotary elements.

5. An implement according to claim 4 characterized in that the effective diameter of at least said one training member is larger than the effective diameter of at least said one rotary element, whereby a given degree of movement of the thrust device causes more than said given degree of movement of the tension member.

6. A material unloading implement comprising:
a material container, the material container having a material unloading station; a material pushing member which can be mounted on the material container for movement towards the material unloading station to move material within the container towards the unloading station; a thrust device actuable by fluid pressure, and thrust from the thrust device to the material pushing member to move the material pushing member towards the material unloading station, wherein the thrust transmission means comprises a flexible tension member, there being also provided at least two training members around which the flexible tension member can be trained, whereby in use the flexible tension member draws the material pushing member towards one of the training member, and wherein each training member is mounted inside a housing therefor mounted on the material container outside said container, the housing having at least one opening to permit the flexible tension member to enter the housing and to be trained around the training member, said housing thereby forming a substantially liquid-tight extension of said container.

7. An implement according to claim 6 characterized in that the training member is mounted on a rotatable shaft extending into the housing, a seal being provided between the shaft and the housing.

8. A material unloading implement comprising:
a material container, the material container having a material unloading station; a material pushing member which can be mounted on the material container for movement towards the material unloading station to move material within the container towards the unloading station; a thrust device actuable by fluid pressure; and thrust transmission means to transmit thrust from the thrust device to the material pushing member to move the material pushing member towards the material unloading station, wherein the thrust transmission means comprises a flexible tension member, there being also provided a training member around which the flexible tension member can be trained, whereby in use the flexible tension member draws the material pushing member towards the training member, and wherein each training member is mounted inside a housing therefor, the housing having at least one opening to permit the flexible tension member to enter the housing and to be trained around the training member, edges defining the opening in the housing which permits the flexible tension member to enter the housing, proportioned so as to fit closely around said tension member to prevent the entry of objects such as stones into the housing with the tension member and wherein the flexible tension member is in the form of a chain comprising a series of closed loop links and the edges defining the opening in the housing define an opening in the shape of a cross.

* * * * *